(12) United States Patent
Panjwani et al.

(10) Patent No.: US 7,352,866 B2
(45) Date of Patent: *Apr. 1, 2008

(54) ENHANCED SUBSCRIBER AUTHENTICATION PROTOCOL

(75) Inventors: Prakash Panjwani, Carol Stream, IL (US); Simon Blake-Wilson, Toronto (CA)

(73) Assignee: Certicom, Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/521,358

(22) Filed: Sep. 15, 2006

(65) Prior Publication Data

US 2007/0014410 A1    Jan. 18, 2007

Related U.S. Application Data

(63) Continuation of application No. 09/871,672, filed on Jun. 4, 2001, now Pat. No. 7,123,721, which is a continuation of application No. PCT/CA99/01162, filed on Dec. 6, 1999.

(30) Foreign Application Priority Data

Dec. 6, 1999    (CA) .................................... 2255285

(51) Int. Cl.
  *H04K 1/00*    (2006.01)
  *H04L 9/00*    (2006.01)
  *H04M 1/66*    (2006.01)
(52) U.S. Cl. ..................... 380/270; 713/168; 455/411
(58) Field of Classification Search ................ 380/255, 380/259, 270; 713/168, 171, 182; 455/411
   See application file for complete search history.

(56) References Cited

U.S. PATENT DOCUMENTS

| | | | |
|---|---|---|---|
| 5,153,919 A | 10/1992 | Reeds, III et al. | |
| 5,351,297 A | 9/1994 | Miyaji | |
| 5,406,628 A * | 4/1995 | Beller et al. | ............. 380/30 |
| 5,544,245 A | 8/1996 | Tsubakiyama | |
| 5,559,886 A | 9/1996 | Dent et al. | |
| 5,784,463 A | 7/1998 | Chen et al. | |
| 5,883,960 A | 3/1999 | Maruyama et al. | |
| 6,073,237 A * | 6/2000 | Ellison | ............. 713/171 |
| RE36,946 E | 11/2000 | Diffie et al. | |
| 6,209,093 B1 | 3/2001 | Venkatesan et al. | |
| 6,260,147 B1 | 7/2001 | Quick, Jr. | |

(Continued)

FOREIGN PATENT DOCUMENTS

EP    0858186    8/1998

(Continued)

OTHER PUBLICATIONS

Park et al., Security Protocol for IEEE802.11 wireless local area network, Mobile Networks and Applications 3 (1998) pp. 237-246.*

(Continued)

*Primary Examiner*—MinhDieu Nguyen

(57) ABSTRACT

The present invention provides a method of authenticating a pair of correspondents in a communication system, such as in a mobile phone network by utilizing a blend of public-key cryptography and symmetric cryptography. Each session between the mobile phone and the network consists of public-key based mutual authentication and key exchange followed by symmetric-key secure data exchange.

24 Claims, 2 Drawing Sheets

MS                                                                                           BS bP, BS_ID

MS_ID, MS_RC, MAC$_k${2, MS_ID, BS_ID, MS_RC, bP}

MAC$_k${3, BS_ID, MS_ID, bP, MS_RC}

U.S. PATENT DOCUMENTS

| | | |
|---|---|---|
| 6,336,188 B2 | 1/2002 | Blake-Wilson et al. |
| 6,772,331 B1 * | 8/2004 | Hind et al. ................. 713/151 |
| 7,079,656 B1 * | 7/2006 | Menzel et al. .............. 380/283 |

FOREIGN PATENT DOCUMENTS

| | | |
|---|---|---|
| GB | 2297016 | 7/1996 |
| JP | 8160857 | 6/1996 |
| WO | WO 98/51032 | 11/1998 |

OTHER PUBLICATIONS

"Public Key Cryptography for the Financial Services Industry: Elliptic Curve Key Agreement and Transport Protocols," ANSI X9.63, Oct. 5, 1997, pp. 45-47.

Koblitz, Neal, "Elliptic Curve Cryptosystems," Mathematics of Computation, Jan. 1987, pp. 203-209, vol. 48, No. 177.

Diffie-Hellman, New Directions in Cryptography, Nov. 1976, IEEE Transaction on Information Theory, pp. 644-654.

* cited by examiner

ENHANCED SUBSCRIBER AUTHENTICATION PROTOCOL

This application is a continuation of U.S. patent application Ser. No. 09/871,672 filed Jun. 4, 2001, now U.S. Pat. No. 7,123,721, which is a continuation of PCT patent application Ser. No. PCT/CA99/01162 filed Dec. 6, 1999, which claims priority from Canadian Patent Application No. 2,255,285 filed Dec. 4, 1998.

This invention relates to a cryptographic system, and more particularly to an authentication protocol utilizing elliptic curve encryption schemes.

BACKGROUND OF THE INVENTION

In constrained environments where computation power, storage space, and bandwidth are severely limited, as is the case for mobile phones, public-key cryptography was considered inefficient and therefore not a viable option. However, with the advent of faster processors and more efficient public-key cryptographic techniques, such as use of elliptic curve mathematics, traditional obstacles that prohibited use of public-key cryptography have essentially been overcome. Indeed, public-key cryptography has already been incorporated into mobile phones for applications as well as over the air service provisioning. These events allow the wireless industry to exploit the advantages of public-key cryptography in third generation systems.

Mobile phones that communicate over RF networks represent a classic example of the problems facing data security. RF networks are easy to eavesdrop so data sent by a phone can easily be monitored by an adversary and the medium itself prevents data being placed in physical opaque envelopes to ensure secrecy. In fact data sent over RF networks by mobile phones may be subject not just to eavesdropping. It is also possible for an adversary to intercept messages and replace them, delete them, or subvert them. Mobile phones users therefore need diverse security services such as the assurance that data it receives is genuine as well as the assurance that data it sends will remain secret. Data security services needed between a mobile phone and a service provider communicating over an RF network include:

Data Confidentiality: Both the mobile phone user and the service provider may want messages they exchange to remain secret. For example, the mobile phone user may want adversaries to be unable to eavesdrop on sensitive calls.

Data Integrity: Both the mobile phone user and the service provider may want messages they exchange to remain unaltered. For example, the service provider may want the assurance that the call request it receives specifies the same number that the user dialed so that the call can be completed as dialed.

Data authentication: Both the mobile phone user and the service provider may want to know the origin of data they receive. For example, the service provider may want to know the origin of a call request so that it can decide whether to complete the call.

Non-repudiation: The mobile phone user may wish to send data that is non-repudiable, meaning that the user cannot later deny sending the data. For example, the user may wish to complete a financial transaction such a buying stock over the phone.

Device or entity authentication: Both the mobile phone user and the service provider may want to know who they are communicating with. For example, the service provider may want to check that it is communicating with a paid-up mobile phone user before allowing the user to place calls.

Device authentication should prohibit in particular an adversary from replaying the authorization sent by a valid user in order to gain access to the network.

Cryptography is capable of providing all these services. Encryption schemes can be used to provide data confidentiality, message authentication codes (MACs) or signature schemes can be used to provide data integrity and data authentication, and signature schemes can be used to provide non-repudiation. Entity authentication can be provided using more complicated protocols built out of encryption schemes, message authentication codes, and signature schemes.

Currently, security in cellular networks is limited primarily to device authentication. Before allowing a mobile phone network access, the network or service provider authenticates the phone using a protocol based on a message authentication code. The need for additional security services like those listed above has motivated the cellular industry to provide more comprehensive security in future third generation systems.

Authentication in current RF systems consists of device authentication based on symmetric cryptography. The mobile station is provisioned with an Authentication Key, referred to as the A-key, prior to any communication with the cellular network. The A-key is also provisioned in the Authentication Center (AC) of the service provider or home network. The process of provisioning the A-key in the mobile station is part of ""service provisioning"", during which other mobile station specific information is also provisioned. While there are several ways to provision the A-key, Over-The-Air Service Provisioning (OTASP) is recommended. OTASP uses the Diffie-Hellman protocol to create the A-key concurrently in the AC and the mobile station.

The A-key is then used to create session keys known as SSDs (Shared Secret Data), which are stored in the mobile station and the home network and are used to authenticate the mobile station. The SSDs are derived by hashing the A-key and other information, such as the mobile station's identity. When a user is roaming in another part of the network the home network, at the discretion of the service provider, may decide to share the SSD with the serving network to enable the serving network to authenticate the mobile device itself using SSD. Alternatively, the service provider may require the serving network to authenticate the mobile station by checking with the home network each time. Sharing SSDs with the serving network saves signaling traffic between the two networks when the user is roaming but it also requires a degree of trust in the serving network, since knowledge of SSD enables the serving network to impersonate the mobile station.

When a mobile station powers-on, it ""registers"" with the network. During registration, the mobile station sends its identity to the serving network (assume that the mobile station is roaming) along with an authentication string or MAC (for simplicity, the term MAC is used throughout the rest of the document for authentication string) that is created by hashing SSD, identity information, a random challenge (32-bit number broadcast by the base station), and other information. The serving network queries the user's home network to register the mobile station. The home network, at this point, determines if the SSD is to be shared with the serving network If so, the SSD is passed to the serving network. The serving network computes the MAC by using the same inputs as the mobile station. If the computed MAC matches the one sent by the mobile station, the mobile station is considered authenticated."

The serving network keeps the SSD associated with the mobile station for the duration of the time that the user is registered in that network. During that time, if the user originates a call (referred to as call origination), the mobile station is again authenticated in the same way as it was for registration, except that dialed digits may be used as additional input to the hash. Once again, the serving network computes the MAC and verifies if the two MACs match, thereby authenticating the mobile station. In addition, if a call is received for the user (referred to as call termination), the same procedure is repeated. In short, authentication is based on calculation of a MAC, which is a hash of SSD, a random challenge from the serving network or base station, and other input, such as mobile station's identity and/or dialed digits.

The Authentication Center in the home network may decide to update the SSD in the mobile station, referred to as SSD update. This is accomplished by sending a request to the mobile station to generate a new SSD. In this scenario, mutual authentication of the mobile station to the home network and of the home network to the mobile station is performed prior to storage of the newly generated SSD in the mobile station. The authentication of the home network consists of the following: the mobile station sends a random challenge to the AC; the AC computes a MAC using a component of SSD, the random challenge, and other information, and sends it to the mobile station; the mobile station verifies the received MAC with its own computed value.

There are a number of weaknesses with the current authentication system.

It requires the backbone network connecting the home network and the serving network to be very secure. Messages exchanged on this network must be exchanged confidentially; otherwise, an eavesdropper monitoring this channel can impersonate any active mobile stations.

It imposes high security requirements on the Authentication Center of each service provider. Maintaining the confidentiality of the A-key database at the Authentication Center is essential; otherwise, anyone who learns the contents of the database can impersonate any mobile station at any time. This problem is escalated by the fact that there is no effective disaster recovery mechanism in the event of Authentication Center compromise.

There are security concerns over SSD sharing. If the home network decides to share SSDs with serving networks, this enables the serving network to impersonate mobile stations.

The CAVE algorithm, which is used to provide authentication, itself has security concerns. CAVE has not been published and has not received widespread scrutiny by the cryptographic community. Compromise of CAVE could cause embarrassment for the cellular community, which has already been hurt by the use of unpublished algorithms, such as CMEA.

There are efficiency concerns. A large amount of communication is required on the backbone network linking the home network and the serving network. This communication is substantially increased if the home network is not sharing SSDs with the serving network since now the serving network must communicate with the home network each time it wants to authenticate the mobile station.

Most importantly, the current system does not provide sufficient security services. Device authentication provides limited security to the network since there remains the possibility that an adversary can hijack service after device authentication has been performed. Furthermore, the limited deployment of data privacy services presents a major problem since it means users are wary of placing sensitive calls over the cellular network. This issue will become particularly important in the future if the cellular industry wants to support advanced features like internet browsing and over the air financial transactions.

Global roaming, one of the most promising features of third generation systems, will heighten many of these concerns.

The deployment of a third generation system affords the cellular industry an opportunity to address the deficiencies of the current authentication system. The third generation authentication system therefore needs to meet the following requirements:

Minimization of computation time required by mobile stations for generation of appropriate keys on each access. Since authentication is used for every call, performance is an important consideration. Security should not affect the service being offered to the end-user negatively.

Ability to provide non-repudiation. This is extremely useful in services that are expected to drive deployment of third generation systems.

Minimization of extra network infrastructure. Since third generation is a migration from second generation systems, it is important to take advantage of the current infrastructure in place, where possible.

Scalability. As more and more cellular systems are brought into service each year and with many carriers aiming to provide worldwide roaming, third generation ESA and ESP should provide for the ability to scale without imposing additional costs on carriers.

SUMMARY OF THE INVENTION

This invention seeks to provide a system for subscriber authentication in a network that obviates and mitigates the disadvantage of current systems by utilizing a combination of public-key cryptography and symmetric cryptography.

It is an object of the present invention to provide for mutual authentication of network and mobile station.

In accordance with this invention there is provided a method of authenticating a pair of correspondents in a communication system, said method comprising the steps of: exchanging cryptographic keys between said correspondents, said exchange being based on a public key mutual authentication scheme; and using said keys for encrypting data in a symmetric-key data exchange.

BRIEF DESCRIPTION OF THE DRAWINGS

These and other features of the preferred embodiments of the invention will become more apparent in the following detailed description in which reference is made to the appended drawings wherein.

DETAILED DESCRIPTION OF THE PREFERRED EMBODIMENTS

Figure 1:
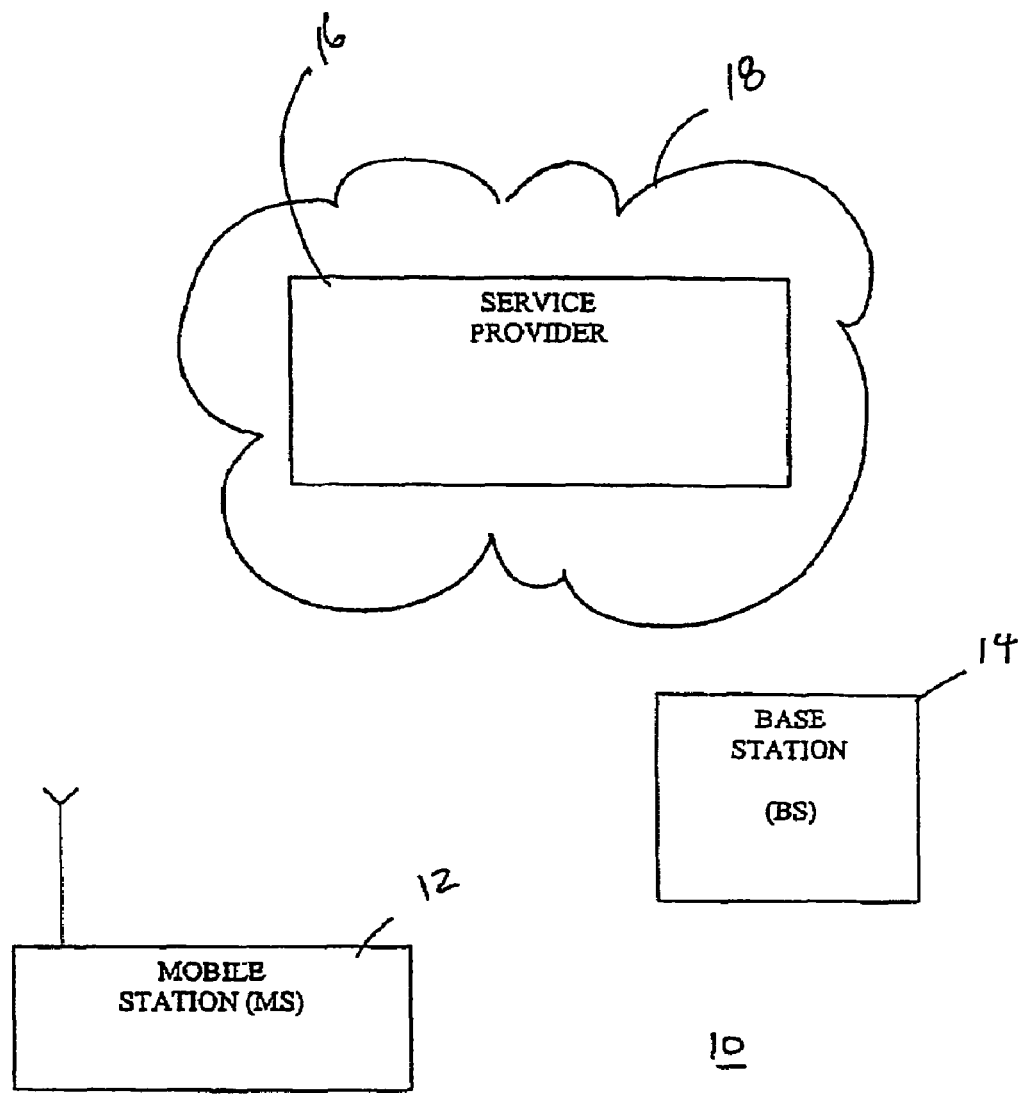
FIG. 1 is a schematic diagram of an RF communication system.

Referring to FIG. 1, a schematic diagram of a communication system is shown generally by numeral 10. The system 10 comprises a mobile station 12, a base station 14, a service provider 16, all of which communicate via a network 18. The network may be RF, cellular, satellite communication or the like.

A third generation system according to an embodiment of the patent invention is based around the same events as the current systems: service provisioning, mobile registration, call origination, call termination, and data exchange. However there are two fundamental differences between the subject system and the current system. First, the proposed system performs registration using a protocol that provides mutual authentication and key establishment and is based on public-key cryptography. Second, the subject system also includes provision to secure data exchange.

Before a mobile station can begin using the cellular network, service provisioning must take place. Elliptic curve parameters are embedded in the mobile station at manufacture time. During service provisioning, the mobile station selects at random an elliptic curve private key and computes the corresponding elliptic curve public key. It now exchanges this public key and its identity confidentially with its service provider who stores the information in its Authentication Center. A variety of mechanisms that can be used by the mobile station and the service provider to exchange the mobile station's public key.

Service provisioning refers to the process of establishing a secure key pair in the mobile station and exchanging all the necessary data between the mobile station and the service provider so that the mobile station is ready to communicate with the network. From a cryptographic perspective, the salient points of this process are key generation and public key exchange.

Key generation can be performed efficiently by the mobile station at any time prior to service provisioning. One approach is to embed a random seed in the mobile station during manufacture and use this seed to generate the private key. This means that the security of the mobile's private key is not based solely on randomness generated by the mobile station. This is desirable because it is notoriously hard to generate randomness on constrained devices.

Having generated a secure key pair at the mobile station, there are many ways to perform public key exchange. It is likely that any deployment of the system would employ a variety of methods. Some of the possibilities are listed below.

Manual exchange during activation at a distributor outlet. The public key of the mobile station could be transmitted securely from the outlet to the Authentication Center of the service provider using a dial-up connection.

Exchange at manufacture time. The manufacturer of the mobile station could retrieve the public key during manufacture and then transmit the public key securely to the service provider when the mobile station user requests service.

Over-the-air exchange. The mobile station and the service provider could exchange the public key over the air when the mobile user requests service. In this case the exchange could be secured using a password established between the user and the service provider, or using a public key of the manufacturer embedded in the mobile station at manufacture time.

Any of these mechanisms would likely provide sufficient security if implemented properly. Over-the-air activation is particularly appealing because it is potentially transparent to the mobile station user.

Service provisioning is completed by establishing an account associated with the mobile station so that the mobile station user can be charged for network service.

To obtain service within a serving network, the mobile station powers on and registers with the network. As in current cellular systems, registration consists of a protocol completed between the base station and the mobile station. However, the subject registration mechanism accomplishes considerably more than just device authentication of the mobile station. It provides mutual authentication of both the mobile station to the base station and the base station to the mobile station and in addition establishes session keys, which are then used to secure future communications between the base station and the mobile station during the session. Authentication and key exchange are supplied by a public-key based protocol outlined below.

The base station enables registration by sending a short-lived elliptic curve public key along with its identifier to the mobile station. This information can either be broadcast on the overhead channel or it can be sent to an individual mobile station in response to a registration request from the mobile station.

In response, the mobile station combines the short-lived base station public key with its own private key and generates two shared secret keys using the elliptic curve Diffie-Hellman method. The first of these two keys is used as a MAC key to authenticate the mobile station to the base station and the base station to the mobile station, and the second is used to establish secret session keys. It then chooses a random challenge, computes an authentication string (i.e., MAC) using the established MAC key, and sends its identity, the random challenge, and the MAC to the base station in order to register.

On receiving the registration request from the mobile station, the base station first contacts the mobile station's service provider, and requests the mobile station's public key. Using the mobile station's public key and its own short-lived private key, the base station also computes two shared secret keys using the elliptic curve Diffie-Hellman method. It uses the first key to check the MAC it received from the mobile station. If this check is successful, the base station registers the mobile station and establishes the mobile station's location, calculates two session keys, and computes a MAC which it uses to authenticate itself to the mobile station. It sends the MAC and the encrypted keys to the mobile station.

Finally, the mobile station checks the validity of the MAC it received from the base station and in turn calculates two session keys. This completes the registration protocol having authenticated both the mobile station to the base station and the base station to the mobile station and established session keys that can be used to secure future communications.

In summary, registration consists of a protocol performed by the mobile station and the base station, which provides mutual authentication and session key establishment. Mobile station authentication is based on its knowledge of its private key. Base station authentication is based on its knowledge of the mobile station public key.

After registration, when the mobile station and the base station wish to exchange data, they use the session keys established during registration to secure the exchange. The same cryptographic mechanism can be used to secure data whether it is to be exchanged on the control channel or the voice channel, and even if the data is a call origination request from the mobile station to the base station or a call termination request (i.e. a page) from the base station to the mobile station.

The sender takes the data and, if privacy is on, encrypts the data using the first session key. It appends to the result a counter indicating the number of messages that have been exchanged so far, and a direction flag indicating whether the data is being sent from the mobile station to the base station or from the base station to the mobile station. It then MACs the resulting string using the second session key and sends the encrypted data along with the MAC.

This process is described in detail in below.

It is worth noting that the subject system is in many ways less complicated than heretofore authentication systems. The use of public-key cryptography means there is no need for two-tier key management using A-keys and SSDs. This is because in the subject system service providers do not need to share information with serving networks which enables the serving networks to impersonate the mobile station. The use of session keys to secure data exchange means that it is not necessary to re-authenticate the mobile station during call origination and call termination. Instead call origination and call termination can be secured just like any other data exchange between the mobile station and the base station using the session keys.

Registration is performed each time a phone powers on and attempts to establish service in a serving network. Registration consists of an authenticated key establishment protocol which provides authentication of the mobile station to the base station and of the base station to the mobile station, as well as supplying session keys to the mobile station and the base station which they will use to secure future communications.

The key establishment protocol employs a number of cryptographic primitives: the elliptic curve Diffie-Hellman key agreement with SHA-1 based key derivation as described in ANSI X9.63, and the SHA-1 based HMAC message authentication code as described in N. Koblitz. Elliptic curve cryptosystems. Mathematics of Computation, 48, pages 203-209. 1987.

Figure 2:
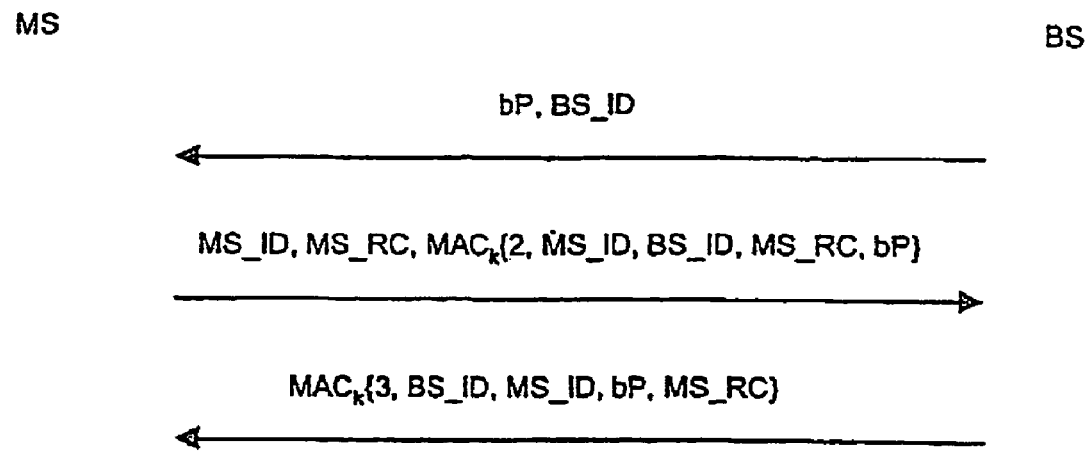
FIG. 2 is a schematic diagram showing an authenticated key establishment protocol according to an embodiment of this invention.

The following notation is used in the following description:

Base Station=BS
Base Station's identifying information=BS_D
Base Station's short-lived private key=b
Base Station's short-lived public key=bP
Cofactor of elliptic curve=t
Direction indicator (MS-originated or BS-originated)=Dir
Elliptic curve parameters=E
Encryption key for key establishment=k'
Encryption key used to encrypt subsequent communications=c'
Generator point on elliptic curve=P
HMAC on M under key k=$MAC_k\{M\}$
Key derivation function based on SHA-1=KDF
Message Authentication Code=MAC
Message counter=Count
MAC key for key establishment=k
MAC key used to MAC subsequent communications=c
Mobile station=MS
Mobile Station's identifying information=MS_ID
Mobile Station's private key=m
Mobile Station's public key=mP
Mobile Station's random challenge=MS_RC
Symmetric Encryption of M using k'=$ENC_k(M)$
Symmetric Decryption of C using k'=$SKD_k(C)$ Referring to FIG. 2, a cryptographic protocol according to an embodiment of the present invention is shown generally by numeral 20.

The base station sends its short-lived public key bP and its identity BS_ID to the mobile station. Like the base station random challenge in the current authentication system, bP should either be unique to a single registration (when it is sent upon request) or should be changed frequently.

The mobile station calculates tmbP from bP using its private key m, checks tmbP≠O, and generates two keys k and k' from tmbP using SHA-1: k, k'=KDF{tmbp}. The use of the cofactor t prevents small subgroup attacks.

The mobile station generates a random challenge MS_RC. It computes a MAC under key k on 2,MS_ID, BS_IDMS_RC,bP: $MAC_k$ {2,MS_ID,BS_D,MS_RC bP}.

The mobile station sends a registration request message to the base station consisting of MS_ID, MS_RC, and the MAC computed as above: $MAC_k$\{2,MS_ID,BS_ID, MS_RC,bP\}. The base station contacts the mobile station service provider, and retrieves the public key of the mobile station.

The base station calculates tmbP from mP and its short-lived private key b, checks tmbP≠O, and generates the keys k and k' from tmbP using SHA-1: k,k'=KDF {tbmP}.

The base station computes the MAC on the same information as the mobile station and compares its computed value with the value sent by the mobile station. If the value matches, the mobile station is authenticated by showing that it knows its private key m. The base station updates the location of the mobile station, and computes a MAC under key k on 3,BS_ID,MS_D,bP,MS_RC: $MAC_k$ {3,BS_D,MS_ID,bP,MS_RC}.

The base station sends a registration acknowledge message to the mobile station consisting of the MAC computed above: $MAC_k$\{3,BS_ID,MS_ID,bP,MS RC\}.

The mobile station computes the MAC on the same information as the base station and compares its computed value with the value sent by the base station. If the value matches, the base station is authenticated by showing that it knows the mobile station public key MP.

Both the mobile station and the base station calculate session keys c and c' from the shared secret key k', the base station short-lived public key bP, and the mobile station challenge MS_RC: c,c'=KDF{k',bP,MS RC}. The session keys c and c'are stored and used to secure future communications in this session between the mobile station and the base station.

This protocol achieves mutual authentication and session key establishment. The session keys established should be sufficient to secure all future communications in this session between the mobile station and the base station until either the base station or the mobile station issues a session termination request. Session termination may occur either because the mobile station roams away from the base station or because the mobile station powers off. Alternatively the base station may choose to terminate the session at any time and require the mobile station to register again.

A variant of the protocol may also be of use in third generation systems. Instead of achieving base station authentication by keeping the mobile station public key secret within the network, base station authentication could be achieved using a long-lived base station public key stored in a certificate issued to the base station by the service provider. In this variant, the public key of the service provider would be downloaded into the mobile station during service provisioning. The base station would send its certificate along with a random challenge to the mobile station during the first flow of the protocol. The protocol would then proceed as before. The advantage of this approach is that it does not require the network to maintain the secrecy of mobile station public keys. The disadvantage is that it requires service providers tQ act as Certification Authorities and issue certificates to base stations, and it requires increased computation by mobile station since they must verify the certificate of the base station during registration.

Once the mobile station and base station have authenticated each other and established the session keys during the registration process, future communications, such as call origination, call termination, etc., are secured using the session keys. The mechanism proposed here provides a combination of data confidentiality, data integrity, and data authentication.

Figure 3:
FIG. 3 is a schematic diagram showing a secure data exchange according to an embodiment of this invention.

The mechanism is illustrated in FIG. 3 and described below. It employs SAC using SHA-1 for authentication and integrity and a generic cipher for privacy.

Suppose the mobile station and the base station want to exchange some data m and that this is the $i^{th}$ message they have exchanged during this session. Then the sender first encrypts the message under key c' using the cipher. Then the sender appends to the encryption a counter whose value is i indicating that this is the $i^{th}$ message exchanged during the session and a direction flag which is a single bit indicating whether the message is being sent from the mobile station to the base station or from the base station to the mobile station. The sender then MACs the resulting string using HMAC with SHA-1 under key c. The encrypted data and the MAC are sent to the receiver.

When the encrypted data and the MAC are received, the receiver first checks the authenticity of the message. They append the appropriate counter value and direction flag to the encrypted data and recalculate the MAC value using c. If the MACs are the same, they have confirmed the authenticity of the message. The recipient then recovers the data itself by decrypting the encrypted data using the cipher under key c'.

This process ensures the authenticity, confidentiality, and integrity of the data. Use of the direction indicator prevents an attack where an active adversary bounces a message back to the sender. Use of the message counter prevents an active adversary from reordering messages.

This process is executed whenever the mobile station and the base station want to exchange data. The same process is used for call origination requests, call termination requests, voice, and any other data exchange during the session.

There are two variations on this process that may be used:

If privacy is off, then the sender does not encrypt the data m. Instead, the sender includes the message in the clear in the MAC calculation, thus sending the following to the recipient: m, $MAC_c\{Dir,Count,m\}$.

If privacy is on and it is deemed that the cipher being used is capable of providing authenticity as well as privacy, then the sender may use the cipher both for authenticity and privacy. In this case, the sender sends the following to the recipient: $ENC_{c'}\{Dir,Count,m\}$. Some systems often assume that block ciphers like DES are capable of providing both authenticity and confidentiality. This variant can save the computational resources of the sender and the recipient since only one symmetric operation is required.

In the event that different privacy algorithms are being used on the control channel and the traffic channel, three session keys—c, c', and c"—are established during registration instead of two. Messages are now exchanged securely just as described above, except that c' is used to encrypt m if m is being sent on the control channel, and c" is used to encrypt m if m is being sent of the traffic channel.

Although the invention has been described with reference to certain specific embodiments, various modifications thereof will be apparent to those skilled in the art without departing from the spirit and scope of the invention as outlined in the claims appended hereto.

What is claimed is:

1. A method of a first correspondent authenticating a second correspondent in a communication system, said method comprising:

said first correspondent exchanging cryptographic keys with said second correspondent based on a public key mutual authentication scheme, said mutual authentication comprising: said first correspondent transmitting a short term public key along with an identifier to said second correspondent to enable said second correspondent to combine its private key with said short term public key and generate a pair of shared secret keys therefrom wherein a first of said shared secret keys is used for said mutual authentication and a second of said shared secret keys is used for establishing a secret session key, said first correspondent using a short term private key and a public key of said second correspondent to generate said pair of shared secret keys, and said first correspondent using said second of said shared secret keys to establish said session key; and said first correspondent using said session key for encrypting data in a symmetric-key data exchange.

2. The method according to claim 1, said first correspondent being a base station and said second correspondent being a mobile station.

3. The method according to claim 1, including said first correspondent receiving a registration request from said second correspondent, said registration request being generated by computing an authentication string using the first of said shared secret keys.

4. The method according to claim 1, including comparing said first of said shared secret keys received from said second correspondent with said first of said shared secret keys generated by said first correspondent; and computing a pair of session keys for said data exchange.

5. A communication system comprising a first correspondent and a second correspondent, each of said correspondents having a respective identity, said first correspondent having a private key and a public key derived therefrom, said system being configured for establishing communication between said first and second correspondent by:

a) said second correspondent obtaining said public key of said first correspondent;

b) said second correspondent sending a short-lived public key and said second correspondent's identity to said first correspondent;

c) said first correspondent combining its private key with said short-lived public key and generating a pair of secret keys therefrom;

d) said first correspondent using a first of said pair of secret keys to compute a first MAC on its identity, said second correspondent's identity, a random challenge, and said short-lived public key;

e) said first correspondent sending its identity, said random challenge, and said first MAC to said second correspondent, thereby requesting registration;

f) said second correspondent using a short-lived private key corresponding to said short-lived public key and said first correspondent's public key to generate said pair of secret keys;

g) said second correspondent using said first of said pair of secret keys to compute a second MAC on its identity, said first correspondent's identity, said random challenge, and said short-lived public key;

h) said second correspondent verifying said first MAC using said first of said pair of secret keys;

i) said second correspondent sending said second MAC to said first correspondent, thereby registering said first correspondent;

j) said first correspondent verifying said second MAC using said first of said pair of secret keys;

k) said correspondents each computing a pair of session keys from a second of said pair of secret keys, said short-lived public key, and said random challenge; and l) said correspondents using at least one of said session keys in a secure communication.

6. The system according to claim 5, said first correspondent being a mobile station and said second correspondent being a base station.

7. The system according to claim 5, said secure communication being a data exchange between said first and second correspondents, said data exchange being used for any one or both of internet browsing and financial transactions.

8. The system according to claim 5, said second correspondent obtaining said public key from a service provider of said first correspondent.

9. The system according to claim 8, said service provider obtaining said public key by a manual exchange at a distributor outlet.

10. The method according to claim 8, said service provider obtaining said public key by an exchange at manufacture time.

11. The system according to claim 8, said service provider obtaining said public key by an over-the-air exchange.

12. The system according to claim 11, said over-the-air exchange being secured using a password established between a user of said mobile station and said service provider.

13. The system according to claim 11, said over-the-air exchange being secured using a password embedded in said mobile station at manufacture time.

14. The system according to claim 5, said private keys, said public keys, and said MACs computed using elliptic curve cryptography.

15. A method of establishing communications between a mobile station and a base station, said mobile station and said base station each having a respective identity, said mobile station having a private key and a public key derived from said private key, said method comprising said mobile station;

a) providing its public key to be obtained by said base station;

b) receiving from said base station, a short-lived public key computed by said base station from a short-lived private key, and said second correspondent's identity;

c) combining its private key with said short-lived public key and generating a pair of secret keys therefrom;

d) using a first of said pair of secret keys to compute a first MAC on its identity, said second correspondent's identity, a random challenge, and said short-lived public key;

e) sending its identity, said random challenge, and said first MAC to said base station, thereby requesting registration;

f) receiving from said base station, a second MAC registering said mobile station, said second MAC having been computed by said base station on its identity, said mobile station's identity, said random challenge and said short-lived public key using a first of said pair of secret keys, said pair of secret keys having been generated by said base station using said short-lived private key and said mobile station's public key; said first MAC enabling said base station to verify said mobile station;

g) verifying said second MAC using said first of said pair of secret keys; and h) computing a pair of session keys from a second of said pair of secret keys, said short-lived public key and said random challenge to enable said mobile station to use at least one of said session keys in a secure communication.

16. The method according to claim 15, said base station being a service provider of said mobile station.

17. The method according to claim 16, said base station having obtained said public key by an over-the-air exchange, said over-the-air exchange being secured using a password established between a user of said mobile station and said base station.

18. The method according to claim 17, said over-the-air-exchange being secured using a password embedded in said mobile station at manufacture time.

19. The method according to claim 15, said private keys, said public keys, and said MACs computed using elliptic curve cryptography.

20. A mobile station for use in a communication system having a base station, said mobile station and said base station each having a respective identity, said mobile station having a private key and a public key derived from said private key, said mobile station being configured for communicating with said base station by:

a) providing its public key to be obtained by said base station;

b) receiving from said base station, a short-lived public key computed by said base station from a short-lived private key, and said second correspondent's identity;

c) combining its private key with said short-lived public key and generating a pair of secret keys therefrom;

d) using a first of said pair of secret keys to compute a first MAC on its identity, said second correspondent's identity, a random challenge, and said short-lived public key;

e) sending its identity, said random challenge, and said first MAC to said base station, thereby requesting registration;

f) receiving from said base station, a second MAC registering said mobile station, said second MAC having been computed by said base station on its identity, said mobile station's identity, said random challenge and said short-lived public key using a first of said pair of secret keys, said pair of secret keys having been generated by said base station using said short-lived private key and said mobile station's public key; said first MAC enabling said base station to verify said mobile station;

g) verifying said second MAC using said first of said pair of secret keys; and h) computing a pair of session keys from a second of said pair of secret keys, said short-lived public key and said random challenge to enable said mobile station to use at least one of said session keys in a secure communication.

21. The mobile station according to claim 20, said base station being a service provider of said mobile station.

22. The mobile station according to claim 21, said base station having obtained said public key by an over-the-air exchange, said over-the-air exchange being secured using a password established between a user of said mobile station and said base station.

23. The mobile station according to claim 22, said over-the-air-exchange being secured using a password embedded in said mobile station at manufacture time.

24. The mobile station according to claim 20, said private keys, said public keys, and said MACs computed using elliptic curve cryptography.

* * * * *

UNITED STATES PATENT AND TRADEMARK OFFICE
CERTIFICATE OF CORRECTION

PATENT NO. : 7,352,866 B2  Page 1 of 1
APPLICATION NO. : 11/521358
DATED : April 1, 2008
INVENTOR(S) : Panjwani et al.

It is certified that error appears in the above-identified patent and that said Letters Patent is hereby corrected as shown below:

On the Title Page, Item (73)
The Assignee's name should be corrected to read: --Certicom Corp--.

Signed and Sealed this

Eighth Day of July, 2008

JON W. DUDAS
*Director of the United States Patent and Trademark Office*